Nov. 1, 1932.  R. C. LOEB  1,885,538
PISTON AND CONNECTING ROD
Filed Aug. 17, 1931

Russell C. Loeb,
INVENTOR
BY Victor J. Evans and Co.
ATTORNEY

Patented Nov. 1, 1932

1,885,538

UNITED STATES PATENT OFFICE

RUSSELL C. LOEB, OF MYERSTOWN, PENNSYLVANIA

PISTON AND CONNECTING ROD

Application filed August 17, 1931. Serial No. 557,644.

This invention relates to bushings for piston pins and has for the primary object, the provision of a device of the above stated character which will automatically adjust itself to compensate for wear thereon and the pin to which it is applied, thereby reducing to a minimum wrist pin trouble in engines or wherever a wrist pin may be employed and obviates the use of over-size wrist pins and the necessity of reaming the parts to receive such pins.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a sectional view illustrating a bushing applied to a connecting rod and wrist pin of a piston and constructed in accordance with my invention.

Figure 1:
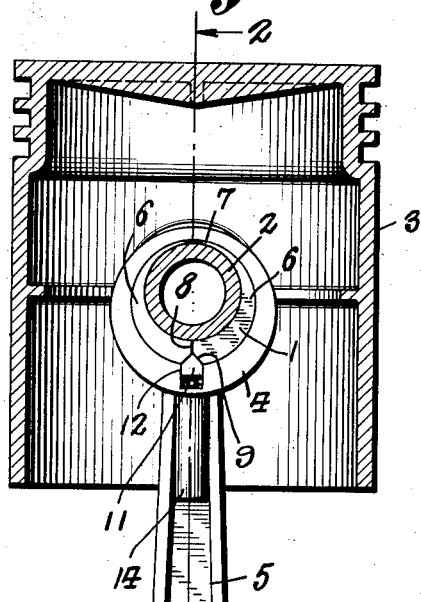
Figure 2:
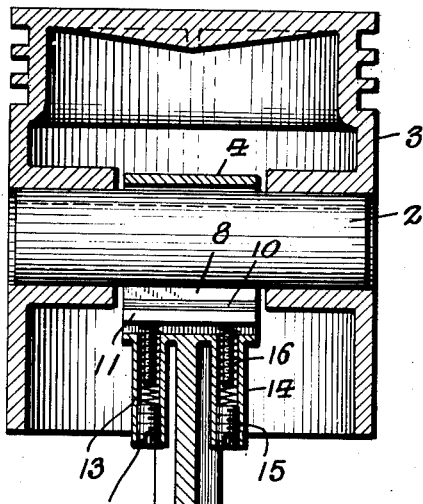
Figure 2 is a sectional view taken on the line 2—2 of Figure 1.
Figure 3:
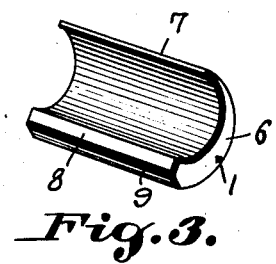
Figure 3 is a perspective view illustrating one of the sections of the bushing.
Figure 4:
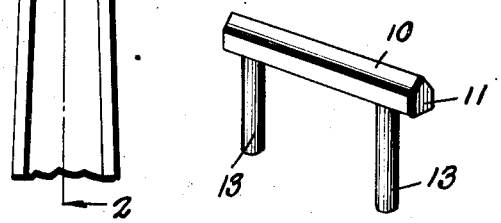
Figure 4 is a perspective view illustrating an adjusting member for the bushing.

Referring in detail to the drawing, the numeral 1 indicates a bushing comprising a part of my invention and is shown as associated with a wrist pin 2 of a piston 3 and also the bearing portion 4 of a connecting rod 5. The bushing 1 is adaptable for use in connection with wrist pins employed for purposes other than that shown in the drawing. The bushing 2 includes a pair of semi-cylindrical sections 6 positioned about a pin 2 as shown in Figure 1 and within the bearing portion 4 of the connecting rod. Each section 6 tapers toward one edge to provide a comparatively narrow edge 7 to the section and a comparatively wide edge 8. The edge 8 is provided with a bevelled face 9. When the sections of the bushing are in assembled position, the faces 9 cooperate in forming a V-shaped notch to receive a V-shaped rib 10 formed on an expanding member 11. The expanding member 11 is of elongated formation and fits within a groove 12 formed in the bearing portion of the connecting rod. Pins 13 are carried by the expanding member 11 and are disposed on opposite sides of the connecting rod and are slidably received within sleeves 14 formed integral with the bearing portion 4. The sleeves 14 are internally screw-threaded to receive screw threaded adjusting plugs 15. Coiled springs 16 are interposed between the adjusting member 11 and the plugs 15 for normally urging the rib 10 against the faces 9 of the sections of the bushing causing said bushing to adjust itself to the pin 2 and thereby take up wear between itself and the wrist pin. By referring to Figure 2 it will be seen that the pins 13 have the springs mounted thereon and provide guides for said springs during the use of the device.

From the foregoing description taken in connection with the accompanying drawing, it will be noted that a self-adjusting bushing is provided for a wrist pin which will take up wear as it occurs, thus maintaining a snug fit between the connecting rod and the wrist pin. By adjusting the plugs 15 within the sleeves 14, the tension of the springs may be varied.

While I have shown and described the preferred embodiment of my invention, it will be understood that minor changes in construction, combination and arrangement of parts may be made without departing from the spirit and scope of my invention, as claimed.

Having thus described my invention, what I claim is:

In combination with a connecting rod having a bearing and a wrist pin extending therethrough, a bushing between the pin and the bearing and including a pair of semi-cylindrical sections and each section tapered toward one edge to provide a comparatively narrow edge and a comparatively wide edge and said wide edge having a tapered face, an adjusting member slidably mounted in the bearing and having wedge shaped faces to engage the tapered faces of the sections to cause the latter to adjust themselves to the pin, sleeves on the connecting rod, pins carried by the adjusting member and slidably received by the sleeves, plugs adjustably secured in said sleeves, and tension means between the plugs and the adjusting member.

In testimony whereof I affix my signature.

RUSSELL C. LOEB.